United States Patent [19]

Eskeli

[11] 4,057,965
[45] Nov. 15, 1977

[54] THERMODYNAMIC MACHINE WITH STEP TYPE HEAT ADDITION

[76] Inventor: Michael Eskeli, 7994-41 Locke Lane, Houston, Tex. 77042

[21] Appl. No.: 703,097

[22] Filed: July 6, 1976

Related U.S. Application Data

[63] Continuation-in-part of Ser. No. 600,312, July 30, 1975, Pat. No. 3,986,361, and a continuation-in-part of Ser. No. 675,304, April 9, 1976.

[51] Int. Cl.² ............................................. F02C 1/04
[52] U.S. Cl. .................................. 60/650; 415/178; 62/401
[58] Field of Search ............... 60/650, 682, 683, 684; 415/1, 178; 62/401

[56] References Cited

U.S. PATENT DOCUMENTS 3,895,491  7/1975  Eskeli ........................... 60/682

Primary Examiner—Allen M. Ostrager

[57] ABSTRACT

A method and apparatus for generating power and for increasing the temperature of heat in a thermodynamic machine wherein a working fluid is circulated within a rotating rotor. In the machine, the rotor contains a heating heat exchanger and a cooling heat exchanger within the rotor, and also a working fluid heat exchanger to transfer heat from one stream of working fluid into another stream, so that one stream is heated and another cooled. The working fluid heat exchanger is in one or more steps, so that the working fluid stream into which heat is added, is being expanded during heat addition, and also the stream may be compressed with heat addition. Heat removal from the other working fluid stream may also be in steps. The machine may be a single rotor unit, or may have two rotors. Alternately, one of the rotors may be held stationary in some instances, to improve working fluid circulation within the machine cavity.

9 Claims, 4 Drawing Figures

THERMODYNAMIC MACHINE WITH STEP TYPE HEAT ADDITION

CROSS REFERENCES TO RELATED APPLICATIONS

This application is a continuation-in-part application of "Turbine with Regeneration", filed 7-30-75, Ser. No. 600,312, now Pat. No. 3,986,361, and "Thermodynamic Machine with Step Type Heat Exchangers", filed 4-9-76, Ser. No. 675,304.

This invention is generally related to apparatus and method for generating power and for increasing the temperature of heat in a thermodynamic machine wherein a working fluid is circulated, within a centrifuge type rotor.

Previously, machines using centrifuge type rotors have been known, where a working fluid is heated from a heat supply and then heat is removed, and work may be generated, or work may be added depending on the function of the machine.

It is an object of this invention to provide a thermodynamic machine of the centrifuge type wherein a working fluid undergoes step type heat addition, with simultaneous exchange of work with the rotor, with the heat to be added being either from a heat source fluid, or from another stream of the same working fluid. It is also an object of this invention that during such heat addition to the working fluid, the pressure of said working fluid is increased, with or without the addition of work from the rotor shaft into the working fluid.

Figure 1:
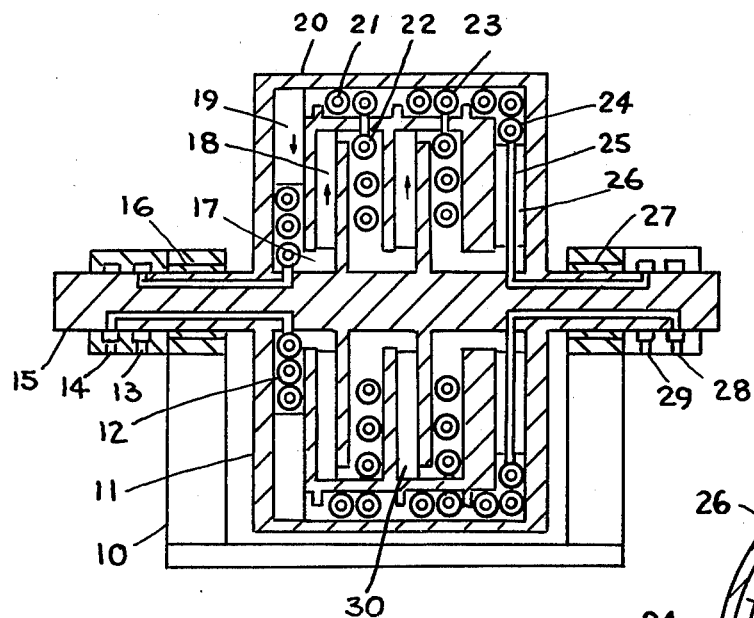
FIG. 1 is a cross section of one form of the apparatus.

Referring to FIG. 1, therein is shown an axial cross section of a unit. 10 is base, 11 is rotor, 12 is heat supply heat exchanger, 13 and 14 are entry and exit for heat supply fluid, 15 is shaft, 16 is bearing, 17 is working fluid passage near rotor center, 18 is outward extending working fluid passage with vane, 19 is a vane in fluid passage, 20 is fluid passage, 21 and 22 form a heat exchanger for transferring heat from the working fluid in peripheral passage into working fluid in outward extending passage undergoing expansion, 23 is another step of heat exchange, similar to 21, 24 is heat removal heat exchanger, 25 is heat delivery fluid conduit, 26 is vane in outward extending working fluid passage, 27 is bearing, 28 and 29 are heat delivery fluid entry and exit, 30 is vane in outward extending fluid passage.

Figure 2:
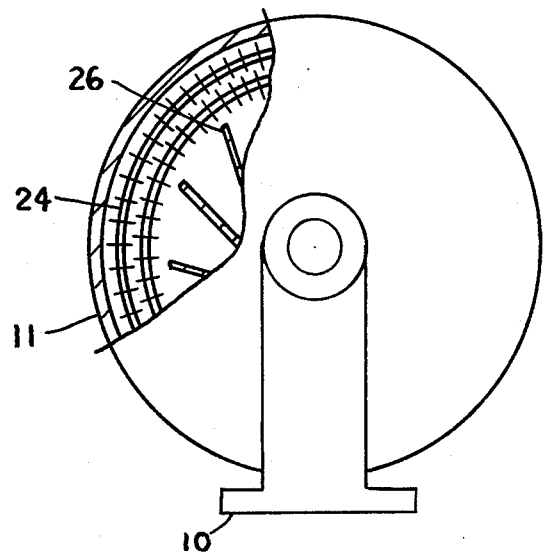
FIG. 2 is an end view of the unit shown in FIG. 1.

In FIG. 2, an end view of the unit of FIG. 1 is shown. 10 is base, 11 is rotor, 24 is heat delivery heat exchanger and 26 is a vane in outward extending working fluid passage, and here said vane is shown with a slope, which may be either forwardly or backwardly as needed for the function of the rotor. Similarly, all the vanes within the rotor may be sloped, and also the heat exchanger fins, which serve as vanes, may be sloped, as desired, to either assist in working fluid circulation or to generate power.

Figure 3:
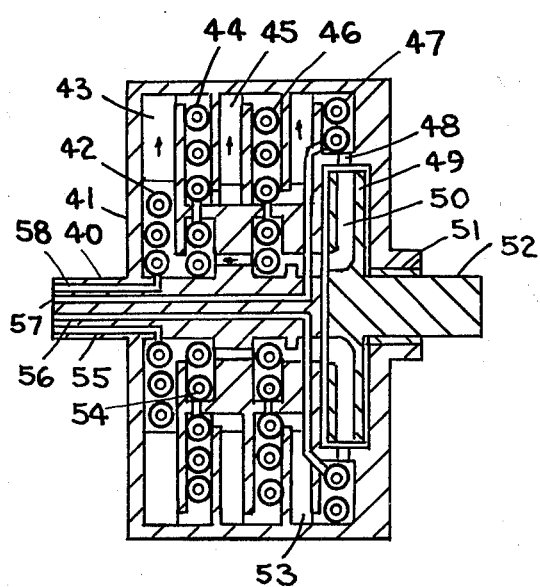
FIG. 3 is a cross section of another form of the apparatus.

In FIG. 3, a cross section of another form of a rotor is shown. 41 is first rotor, 42 is heat exchanger, normally used for heat removal, 43 is vane in outward extending fluid passage, 44 and 46 are working fluid heat exchangers, 45 and 53 are vanes, 47 is heat exchanger, which is usually for heat addition, 48 is working fluid nozzle to discharge the working fluid forwardly into the second rotor 49, 50 is second rotor passage, 51 is bearing for second rotor shaft 52, 54 is part of the working fluid heat exchanger, 55 and 58 are entry and exit for heat transfer fluid to heat exchanger 42, and 56 and 57 are entry and exit for heat transfer fluid to heat exchanger 47, and 40 is first rotor shaft.

Figure 4:
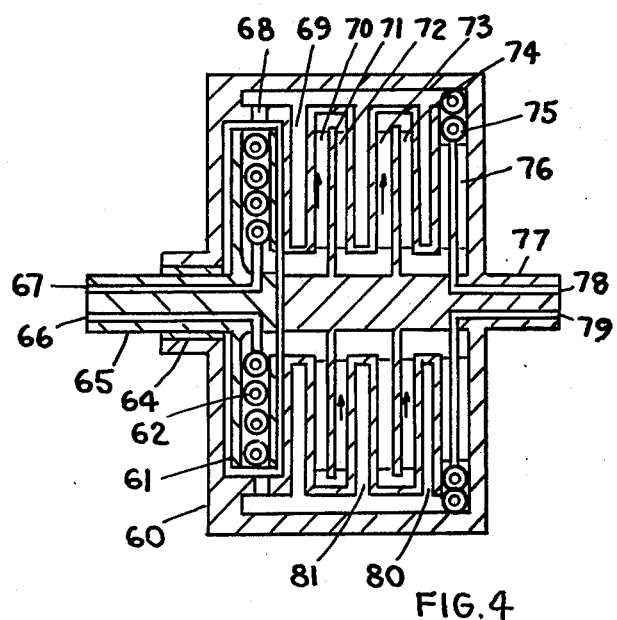
FIG. 4 is a cross section of still another form of the apparatus.

In FIG. 4, another form of the rotor is shown. In this unit, the working fluid heat exchangers may be made of metal sheets, and the second rotor may be either rotating or stationary as desired. 60 is first rotor, 61 is second rotor or stator, 62 is heat supply heat exchanger, 64 is bearing for second rotor shaft 65, 66 and 67 are entry and exit for heat transfer fluid into heat exchanger 62, 68 is working fluid nozzle or opening, 69, 81 and 80 are working fluid spaces for heat transfer purposes, 70 is outward passage, 71 is divider and 72 is inwardly extending passage for the working fluid, 73 and 74 are outward and inward passages, 75 is heat exchanger, 76 is vane, 77 is first rotor shaft, 78 and 79 are heat transfer fluid entry and exit to heat exchanger 75.

In operation, the unit is caused to rotate. The working fluid, which fills the rotor cavity at a predetermined pressure, is compressed as it travels outward in the passages, and is expanded as it travels inward toward rotor axis in the passages, with the fluid movement being preferably as indicated by the arrows in the passages. Thus the unit of FIG. 1 when used as indicated by the arrows, will have heat delivered into it by heat exchanger 12, and heat is delivered by the unit through heat exchanger 24. In the peripheral passage, heat is removed by the working fluid heat exchangers 21 and 23, and heat is added into the working fluid during expansion steps by the working fluid heat exchangers. The heat addition steps comprise in general the outwardly extending passage to compress the working fluid, and an inward extending passage to expand the working fluid. Heat is usually added during the expansion, and may also be added during the compression, in the several steps. Note that the number of steps may be as desired for the working fluid heat exchanger, but generally, numerous steps are preferable.

The operation of the other units shown are similar. The unit of FIG. 3 is primarily a power generator, but may be also used for heating or cooling. Similarly, the unit of FIG. 4 is primarily for the temperature increase of heat, but may also be used for power generation. The second rotor of FIG. 4, may be held stationary during normal operation, if desired.

The function of the heat addition steps, is to increase the pressure of the working fluid, without work addition from the rotor shaft; this occurs, when the radial length of the outward extending working fluid passages is equal for both compression and expansion. The radial length need not be the same, however; and may be as desired. Normally, for each step, the working fluid pressure is increased in a relatively small amount, and by having numerous steps, a substantial pressure increase is obtained. This pressure increase then can be used advantageously to increase the overall efficiency of the unit, both for power generation, and for the transfer of heat from a lower temperature to a higher temperature. In general, the pressure increase is similar to the well known process of constant volume heat addition for non-flow systems, and is generally described in texts on thermodynamics. In the apparatus of this invention, this same effect is obtained for a continuously flowing working fluid. By this means, a high efficiency power generator is obtained, and for heat transfer, a high efficiency unit is also obtained.

The heat addition to the working fluid from external sources may be in a single step, as shown in the drawings, or more than one step for such heat addition may be used, together and in combination with the regenerative type heat transfer shown in the drawings. The selection of the actual combination of external heat addition steps, and the number of regenerative steps, will depend primarily of the available temperatures and the working fluid used, and the results desired.

The method of step type heat addition can be extented to be used with various types of apparatus. The usual requirement for the use of this process is to employ non-flow equipment, such as piston, vane or screw type apparatus, which are of the positive displacement type. Heat can be added into the working fluid during either expansion or during compression by employing a heat transfer fluid, such as oil, for transportation of heat. Suitable methods and apparatus for this are described in my copending patent applications "Thermodynamic machine of the vane type", Ser. 604,347, filed 8-13-75.

In the drawings, the radial length of the various rotor passages are shown to be approximately the same. The radial length may be varied for these passages, to suit, such that for example, passages 70 and 72, or passages 70 and 73 are of different radial lengths, thus providing for different amounts of work exchange between the working fluid and the rotor. Thus, the diameter of the rotor may change, as desired, to provide for work quantities desired for the working fluid and those work quantities actually delivered by the rotor passages into the working fluid. The heat exchangers may be made of finned tubing as shown, or they can be made in various ways, such as sheet metal, as indicated in FIG. 4. The heat transfer fluid to the heat addition and heat removal heat exchangers is shown to be supplied via rotor shaft; other means may be used, such as using heat transfer through rotor walls, or using air, for example, as the heat transfer fluid.

The flow of the working fluid is in the direction shown in the figures, for the preferred use of the units. The flow may be reversed, where the use of the rotor is changed from a power turbine to a heat pump, for example. Nozzles such as 68, are oriented to discharge forwardly for turbine use, and backwardly for heat pump use. Heat may also be transferred regeneratively between radial passages, such as passages 72 and 73, where heat may flow from gas being heated by compression into space 81, and from there into passage 72, where the gas is colder. Obviously, the space 81 could be eliminated, so that heat could flow directly from passage 73 and 72, through a heat conductive wall. This type heat transfer is described in my U.S. Pat. No. 3,962,888. This type heat transfer can be also arranged for the other units shown in the several figures.

I claim:

1. In a thermodynamic machine, wherein a working fluid is compressed and expanded in a cycle, with the compression being provided within an outwardly extending rotor passage and the expansion is being provided within an inwardly extending rotor passage, the outward and the inward ends of said passages being connected by fluid passages to form a continuous working fluid circulation loop, said circulation loop being provided with a heat removal heat exchanger, a heat addition heat exchanger and a regenerative heat exchanger to exchange heat between two streams of the working fluid, the improvement comprising:
   a. providing said regenerative heat exchanger for its heat addition with heat addition steps comprising at least one outwardly extending and at least one inwardly extending fluid passage means, and a heat exchange means to add heat into the working fluid simultaneously with work exchange by the working fluid with the fluid passage means.

2. The thermodynamic machine of claim 1 wherein said heat exchange means is provided to add heat into said working fluid within said inwardly extending fluid passage means.

3. The thermodynamic machine of claim 1 wherein said heat exchange means is provided to add heat into said working fluid within said outwardly extending fluid passage means.

4. The thermodynamic machine of claim 1 wherein the heat addition in said regenerative heat exchanger and in said heat addition heat exchanger are provided with heat addition steps.

5. The thermodynamic machine of claim 1 wherein said working fluid circulation loop is within two rotors of which at least one is mounted for rotation.

6. The thermodynamic machine of claim 1 wherein the heat addition steps are provided for the working fluid stream downstream of said heat addition heat exchanger.

7. In a thermodynamic method wherein a working fluid is compressed and expanded within a closed circulation loop in a centrifugal force field, and wherein a regenerative heat exchanger is provided to exchange heat between two streams of said working fluid, and wherein heat addition and heat removal are provided for the working fluid within said circulation loop, the improvement comprising:
   a. alternately compressing and expanding said working fluid during heat addition within said regenerative heat exchanger;
   b. adding heat into the working fluid stream being compressed and expanded to increase the temperature of such working fluid stream, within said regenerative heat exchanger, with the added heat being received from another stream of said working fluid within said regenerative heat exchanger.

8. The method of claim 7 wherein the heat addition is provided during the expansion part of the heat addition process within said regenerative heat exchanger.

9. The method of claim 7 comprising the additional step of alternately compressing and expanding the working fluid during the heat addition within the closed circulation loop.

* * * * *